Figure 1:
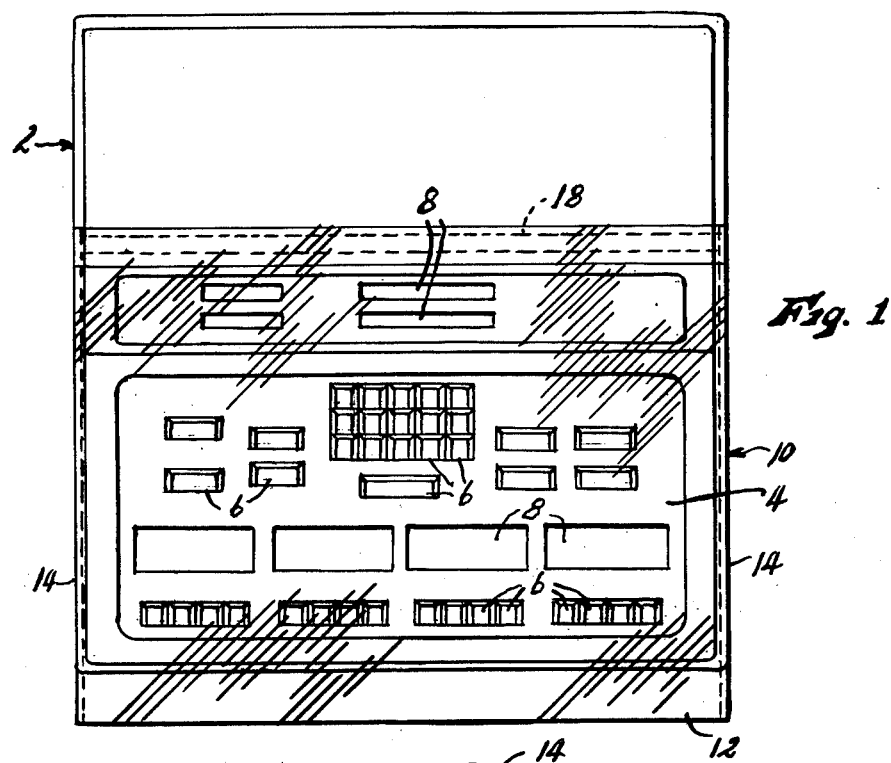

United States Patent [19]

Barnett

[11] 4,449,763

[45] May 22, 1984

[54] PROTECTIVE COVER FOR KEYBOARD MACHINES

[76] Inventor: Loren A. Barnett, 920 Durward Hall Dr., Carthage, Mo. 64836

[21] Appl. No.: 314,123

[22] Filed: Oct. 23, 1981

[51] Int. Cl.³ .................. A47B 21/00; A47B 97/00
[52] U.S. Cl. .................................. 312/208; 312/284; 160/352
[58] Field of Search ............... 312/284, 208; 160/352; 150/52 R; 135/102, DIG. 1; 248/205.3

[56] References Cited

U.S. PATENT DOCUMENTS

| | | | |
|---|---|---|---|
| 999,539 | 8/1911 | Anderson | 312/208 |
| 2,218,296 | 10/1940 | Perras | 160/352 |
| 2,491,957 | 12/1949 | Dilley | 160/352 |
| 2,893,533 | 7/1959 | Childs | 312/208 |
| 2,914,873 | 12/1959 | Brennan | 248/205.3 |
| 3,087,578 | 4/1963 | Reed et al. | 312/208 |
| 3,259,173 | 7/1966 | Manning | 150/52 R |
| 3,774,984 | 11/1973 | Banko et al. | 312/284 |
| 4,060,293 | 11/1977 | Waiters | 312/284 |
| 4,085,864 | 4/1978 | Gordon | 312/208 |
| 4,277,119 | 7/1981 | Uchida | 312/208 |

*Primary Examiner*—Victor N. Sakran
*Attorney, Agent, or Firm*—John A. Hamilton

[57] ABSTRACT

A protective cover for keyboard machines consisting of a transparent hood affixable to the machine housing and open at one side to admit the operator's hand, including a panel generally parallel to the keyboard face and spaced apart therefrom by a distance sufficient to allow normal hand and finger movements by the operator, but too close to permit any appreciable whole-hand movements normally to the keyboard whereby the operator cannot strike the keyboard buttons with excessive force which can damage the machine. The hood prevents access of spilled liquids, paper clips, coins, bits of metal or the like to the keyboard. Such foreign matter may find its way to the interior of the machine through slots and other openings of the keyboard, and cause malfunctioning thereof.

6 Claims, 3 Drawing Figures

PROTECTIVE COVER FOR KEYBOARD MACHINES

This invention relates to new and useful improvements in devices for protecting keyboard machines and instruments from various types of common damage, and has particular reference to a device of this type which consists of a transparent hood adapted to be placed over the keyboard of the machine at a sufficient spacing therefrom to admit the operator's hand therebetween. It has been specifically designed for use with the machines used at many gasoline service stations, which actuate gasoline pumps from a remote station, approve credit, record gallonage and money values of sales, and other functions, but it will be readily apparent that it has wide application to keyboard machines in general.

One of the most common causes of damage to machines of this type is that the operator strikes the pushbuttons of the keyboard with too great a force, causing damage to the electrical contacts or other machine elements operated by said pushbuttons. This type of damage occurs most commonly when the personnel operating the machine are also habitually engaged in more physically strenuous tasks, who often strike the pushbuttons with movements involving the whole hand and arm. This results in virtual hammer blows to the pushbuttons, and damage results, since most keyboard machines are, after all, relatively delicate instruments. The hood, rigidly positioned at a reasonable distance from the keyboard, so restricts movements of the operator's hand and arm as to render it virtually impossible for him to strike the pushbuttons with excessive force.

Another common cause of damage to such machines is that liquids such as water or soft drinks spilled on the keyboard, or small bits of metal such as paper clips, coins and the like, will pass through the slits around the pushbuttons, or other keyboard openings, into the interior of the machines, where they cause short-circuiting of the often very complex electrical system of the machine. Needless to say, a dime rolling over the printed circuit boards of such machines can create havoc. Accordingly, another object of this invention is the arrangement and attachment of the hood relative to the machine housing in such a manner as to prevent access of such foreign matter to the keyboard.

Other objects are extreme simplicity and economy of construction, and efficiency and dependability of operation.

Figure 2:
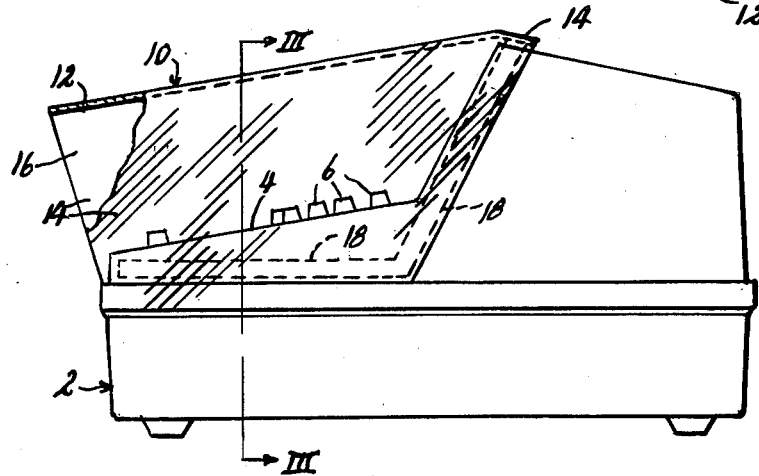
Figure 3:
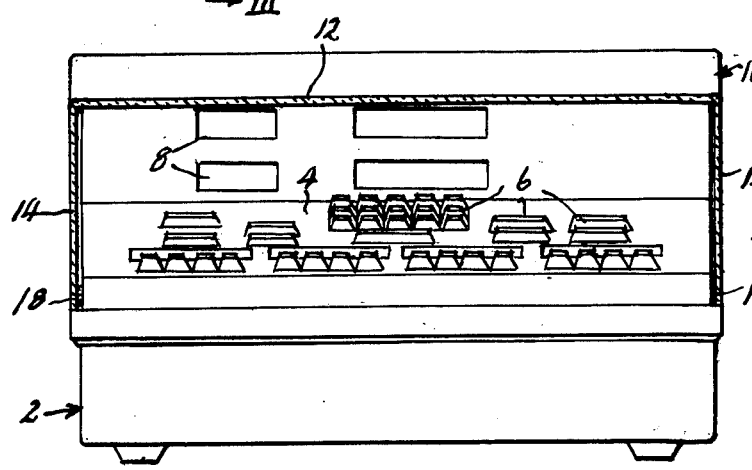

With these objects in view, as well as other objects which will appear in the course of the specification, reference will be had to the accompanying drawing, wherein:

FIG. 1 is a top plan view of an exemplary keyboard machine having a protective cover embodying the present invention applied operatively thereto, FIG. 2 is a side elevational view of the machine and cover as shown in FIG. 1, with the cover partially broken away, and FIG. 3 is a sectional view taken on line III—III of FIG. 2, with the cover partially broken away and the machine left in elevation.

Like reference numerals apply to similar parts throughout the several views, and the numeral 2 applies generally to a keyboard machine having a keyboard face 4 with a large number of pushbuttons 6 projecting upwardly therefrom which must be depressed in a given pattern or sequence to operate the machine properly. The keyboard may also include a number of information read-out windows 8. As illustrated, the machine is of a common type used for the remote control of gasoline dispensing pumps at service stations, but this specific type of machine is not material to the present invention, the only essential feature thereof insofar as the invention is concerned being the presence of the keyboard with its pushbuttons.

The protective cover forming the subject matter of the present invention is indicated generally by the numeral 10, and may be formed of a single properly molded sheet of transparent, at least reasonably rigid material, a clear plastic material commonly known as Plexiglas having been found entirely satisfactory. This cover forms a hood covering keyboard 4, and including a top wall 12 which is generally parallel to the keyboard and spaced apart therefrom by a distance sufficient to permit the insertion of an operator's hand and wrist therebetween, and side walls 14 around the entire periphery of said top wall except at the front of the machine, where the hood remains open, as indicated at 16, to admit the operator's hand. Whenever the design of the machine housing permits it, side walls 14 should depend downwardly from top wall 12 to engage and overlie surfaces of the housing adjacent and preferably below keyboard 4, either vertically as at the lateral sides of the illustrated machine, or at least downwardly inclined as shown along the rearward edge of the illustrated hood. This creates a "skirt" effect which effectively prevents spilled liquids and the like from reaching the keyboard through cracks between the hood edges and the housing. This skirt effect is not always possible, since in some machines the keyboard may be located in a relatively large planar area, in which case the side walls of the cover must engage essentially horizontal surfaces of the housing, or in other cases the keyboard may actually be inclined downwardly toward the pushbutton area. However, as will be explained, readily accomplished variations in the shape of the hood may be made to compensate for these circumstances, and to accomodate the cover to machines of virtually any shape or style.

As shown, the cover 10 is releasably affixed to the machine housing by a strip 18 of double-faced, non-drying adhesive tape attached to the inner surface of the lower edge portions of all of side walls 14. This strip engages and adheres to the machine housing to secure the cover in place, and is continuous around the entire periphery of the cover, except of course at the open front 16 thereof.

In use, it will be seen that with the cover secured in place as described, the operator may view the keyboard clearly due to the transparency of the cover, but must insert his hand through the front opening 16 of the cover in order to reach and operate pushbuttons 6. He may then operate the pushbuttons, but must do so principally with finger movements, or at most with very short hand movements, since upward movement of his hand is restricted by the close proximity of top wall 12 of the cover. Thus he must press the pushbuttons gently as compared to the force he might use in the absence of the cover, since he cannot move his hand far enough from the keyboard to generate the whole-hand and arm movement used in striking the pushbuttons with greater force. The keyboard mechanism is thereby protected against the damage which is often caused by such stronger blows, and this is the principal function of the cover. As shown, the top wall 12 of the cover is extended somewhat forwardly of the keyboard, in order to better protect the forwardmost pushbuttons 6 against blows of excessive force, and also in order to better protect the keyboard against falling foreign matter such as spilled liquids, keys, coins, paper clips and the like, which as previously discussed often find their way through slits and other openings of the keyboard to cause malfunctioning of interior machine parts.

The spacing of top wall 12 of the cover from the keyboard is important. A spacing of about 3-6 inches has been found effective. Though exact adherence to these figures is not particularly critical, it has been found that lesser spacings may uncomfortably restrict and hamper free movement of the operator's hand and fingers, and cause accidental operation of some of the pushbuttons, while greater spacings may negative the primary function of the cover in that the operator is again enabled to strike the pushbuttons with excessive and damaging force.

It is essential that the cover be firmly affixed to the housing of the machine, with sufficient security to prevent its dislodgment by movements of the operator's hand therein. While any effective means could be used for this purpose, the adhesive strip 18 shown has certain advantages, in that it retains the cover in place with fully adequate security, permits easy removal and replacement when necessary for cleaning it, and forms a seal preventing the access of spilled liquid to the keyboard between the machine housing and the lower edges of cover side walls 14. This sealing effect is of course particularly important in cases in which the design of the machine housing does not permit said side walls to form "skirts" extending downwardly around the sides of the housing.

Thus it will be apparent that a protective cover for keyboard machines has been produced which effectively prevents several of the most common causes of damage to such machines which necessitate expensive maintenance and repair work. It prevents an operator from striking the pushbuttons with such excessive force as to damage the keyboard mechanism. It prevents access to the keyboard by much of the foreign matter to which they are commonly exposed, such as spilled beverages, keys, coins, paper clips, bits of wire, and other miscellaneous trash, which otherwise might pass through the slits and other openings almost universally present in such keyboards and cause malfunctioning of the interior machine parts. It is extremely simple in form, economical to manufacture, and may easily be tailored to fit machines of virtually any shape or style.

When I have shown and described a specific embodiment of my invention, it will be readily apparent that many minor changes of structure and operation could be made without departing from the spirit of the invention.

What I claim as new and desire to protect by Letters Patent is:

1. A protective cover for a keyboard machine having a housing presenting an upwardly facing keyboard carrying pushbuttons operable by depression thereof, said cover comprising:
    a. a hood including a transparent top wall generally parallel with and spaced above said keyboard by a distance sufficient to permit insertion of an operator's hand therebetween, but sufficiently small to require the operator to press said pushbuttons principally with finger movements and with only minimal movements of his whole hand normally to the keyboard, and to prevent any substantial whole-hand movements normally to the keyboard, said hood being open at one side to permit said insertion, and
    b. means operable to attach said hood firmly to the housing of said machine.

2. A protective cover as recited in claim 1 wherein said top wall of said hood is spaced apart from said keyboard by a distance of approximately 3 to 6 inches.

3. A protective cover as recited in claim 1 wherein said top wall of said hood is extended outwardly from said keyboard at the open side of said hood, whereby to overhang and better protect said keyboard.

4. A protective cover as recited in claim 1 wherein said hood also includes side walls depending from said top wall thereof at all sides thereof except its open side, and wherein said attaching means is operable to attach the lower edge portions of said side walls to said machine housing.

5. A protective cover as recited in claim 4 wherein said side walls are continuous around the entire periphery of said hood except at its open side, and wherein their lower edge portions extend downwardly past the associated edges of said machine housing, whereby to form a skirt preventing the passage of liquid between said housing and the lower edges of said side walls.

6. A protective cover as recited in claim 4 wherein said side walls are continuous around the entire periphery of said hood except at its open side, and wherein their lower edge portions overlie associated surfaces of said machine housing, and wherein said attaching means comprises a continuous strip of adhesive applied to the inner surface of the lower edge portions of said side wall, along their entire length, and operable to adhere to the machine housing surfaces overlaid thereby.

* * * * *